United States Patent [19]

Wada et al.

[11] Patent Number: 4,503,529
[45] Date of Patent: Mar. 5, 1985

[54] RECORD STYLUS FOR CAPACITANCE DISKS

[75] Inventors: Yoshiyo Wada; Kunio Goto, both of Yokohama; Hideaki Takehara, Fujisawa, all of Japan

[73] Assignee: Victor Company of Japan, Limited, Japan

[21] Appl. No.: 357,355

[22] Filed: Mar. 12, 1982

[30] Foreign Application Priority Data

Mar. 13, 1981 [JP] Japan .................................. 56-36952

[51] Int. Cl.³ .............................................. G11B 9/06
[52] U.S. Cl. ..................................... 369/126; 369/173
[58] Field of Search ................ 369/126, 173, 150, 151

[56] References Cited

U.S. PATENT DOCUMENTS

| | | | |
|---|---|---|---|
| 2,992,007 | 7/1961 | Bondley | 369/173 |
| 4,052,738 | 10/1977 | Hosomi et al. | 369/126 |
| 4,152,641 | 5/1979 | Hughes et al. | 369/126 |
| 4,199,782 | 4/1980 | Wada et al. | 369/126 |
| 4,340,954 | 7/1982 | Chio et al. | 369/173 |

Primary Examiner—Donald McElheny, Jr.
Attorney, Agent, or Firm—Lowe, King, Price & Becker

[57] ABSTRACT

For detection of signals recorded in the form of minute pits along tracks as capacitance variations, a record stylus is disclosed as comprising a shank having a portion of cross-sectional area decreasing toward one end of the stylus. A diamond, partially embedded in the shank, has a decreasing cross-sectional area toward said end of the stylus as a continuation of the decreasing cross-section of the shank. The bottom and rear face of the diamond are inclined so that the adjacent angle therebetween is smaller than 90 degrees. An electrode attached to the rear face of the diamond extends from the bottom of the diamond toward the other end of the stylus. The electrode is thus inclined in a direction opposite to the direction of movement of the recording medium to provide less concentration of electric lines of force on the rear bottom edge thereof.

8 Claims, 9 Drawing Figures

RECORD STYLUS FOR CAPACITANCE DISKS

BACKGROUND OF THE INVENTION

The present invention relates to a record stylus for capacitance disks in which signals are recorded in the form of geometric variations along each of spiral or concentric tracks and detected by the stylus in the form of capacitance variations.

A record stylus of the capacitance detection type comprises an insulative body such as diamond or sapphire and an electrode deposited on a rear surface of the insulative body. The electrode, the width of which is substantially equal to the width of the track, extends from the bottom of the insulative body toward its upper end for connection to an external processing circuit. The thickness of the electrode is typically of the order of 2000 to 3000 Angstrom to pick up signals which are recorded in the form of minute pits having a minimum length of 3000 Angstrom in the direction of travel of the disk and a depth of 3000 Angstrom. To detect capacitance variations a high-frequency bias, typically at 1 Gigaherz, is applied to the stylus electrode with respect to a conductive film embedded in the disk record. A shortcoming inherent in the conventional capacitance stylus is a problem of wear that occurs on the bottom edge of the electrode such that it diminishes in length as much as 500 Angstrom with a resultant increase in spacing between the electrode and the record surface. Conventional capacitance detection type record styli thus degrade as a function of time in signal output level, signal-to-noise ratio and in high frequency response, and crosstalk eventually occurs between adjacent tracks.

Various attempts have hitherto been made to mitigate this wear problem on the assumption that the wear is caused by the difference in material's hardness and abrasion resistance properties between the insulative support and the electrode. One approach involved sandwiching the electrode between two insulative supports so that the rear face of the electrode is not exposed to air. Another approach involved the provision of an insulative protective layer such as aluminum oxide or silicon dioxide on the electrode. However, satisfactory results have not yet been obtained.

SUMMARY OF THE INVENTION

The present invention is based on the discovery that the inclination of the electrode is a critical factor that determines the usable life time of the stylus. Specifically, prior art capacitance detection styli have an electrode formed on a rear face which is vertical or inclined toward the rear. It is found that a greater number of electric lines of force occur on the bottom rear edge of the electrode than on its front bottom edge which interfaces with the diamond support as the disk spins at high speeds. It is found that the prime cause of the wear is attributed to a concentration of high-frequency electric field on the rear bottom edge of the electrode. Such field concentration causes the electrode to wear forming a rounded edge which acts in a sense to provide a greater number of electric lines of force to accelerate the wear.

For detection of signals recorded on a record disk in the form of minute pits along tracks the record stylus of the invention comprises a shank having a portion with a decreasing cross-sectional area toward one end of the stylus. A diamond is partially embedded in the shank and has a decreasing cross-sectional area toward said end of the stylus as a continuation of the decreasing cross-section of the shank. The bottom and rear face of the diamond are inclined so that the adjacent angle therebetween is smaller than 90 degrees. An electrode is attached to the rear face of the diamond so that it extends from the bottom of the diamond toward the other end of the stylus.

When in operation the stylus is inclined in a direction opposite to the direction of movement of the disk so that the bottom of the diamond is aligned with the disk surface, the rear face of the electrode makes an obtuse angle to the surface of the disk. This significantly reduces the the concentration of electric lines of force on the rear bottom edge of the electrode and minimizes the amount of wear.

BRIEF DESCRIPTION OF THE DRAWINGS

The invention will be described in further detail with reference to the accompanying drawings, in which.

DETAILED DESCRIPTION

According to experiments conducted by the inventors, a record stylus was placed in contact with the spinning capacitance disk without applying high-frequency field therebetween for a period of 500 hours. The result showed that no wear occurred in the electrode. Whereas, wear occurred in a similar test when the high-frequency field is applied between the stylus and disk. It is considered that the wear is the result of combined effects of electron emission from the electrode that occurs when the strength of the high-frequency field exceeds the work function of the compositions of the electrode and ionization by the emitted electrons of surrounding air molecules which in turn bombard and oxidize the electrode surface and drive the oxidized compositions off the surface.

Figure 1:
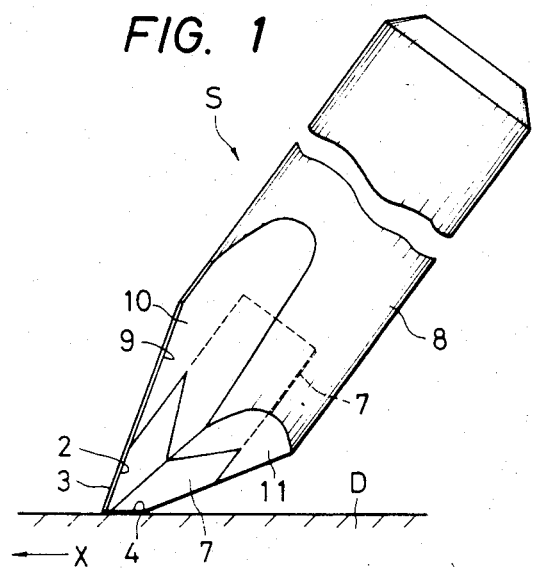
FIG. 1 is a side view of the record stylus of the invention.

FIG. 1 is an illustration of an embodiment of the capacitance detection stylus according to the invention. The stylus S is shown having its longitudinal axis inclined opposite to the direction of movement of a capacitance disk record D (indicated by an arrow X) with its bottom being aligned with the record surface. The stylus has a portion with a decreasing cross-sectional area toward the bottom of the stylus. The stylus comprises a diamond 7 of which the greater part is embedded in a metal shank 8 formed preferably of titanium or hafnium. The diamond and metal shank are cemented together by means of silver solder which appears as a layer 9. The lower end of the stylus is shaped to form rear side faces 10, front side faces 11, a rear face 2 and a flat bottom face 4. A conductive material having a good afinity to diamond such as titanium or hafnium is vacuum deposited on the rear face 2 to form an electrode 3 which extends from the bottom face 4 upward to make ohmic contact with the conductive body 8. The electrode has a width increasing as a function of distance from its bottom edge so that it subtends an angle of, typically, 10 degrees at the bottom end thereof.

Figure 2:
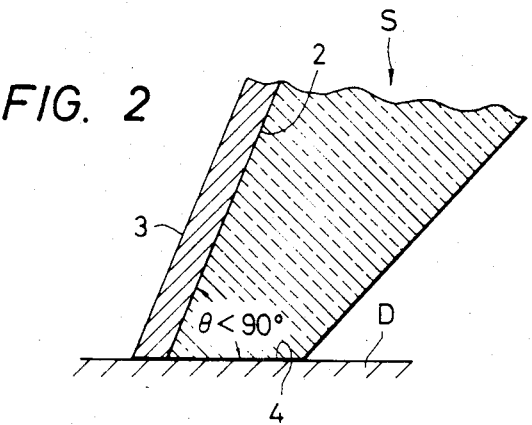
FIG. 2 is a partial cross-sectional view of the stylus.

According to the invention, the rear face 2 is inclined toward the bottom 4 at an angle $\theta$ thereto so that an acute angle is formed therebetween, the rear side making an obtuse angle to the surface of record disk D, as clearly shown in FIG. 2. The forward inclination of the electrode 3 is found to significantly decrease the amount of wear at its rear bottom edge.

Figure 3:
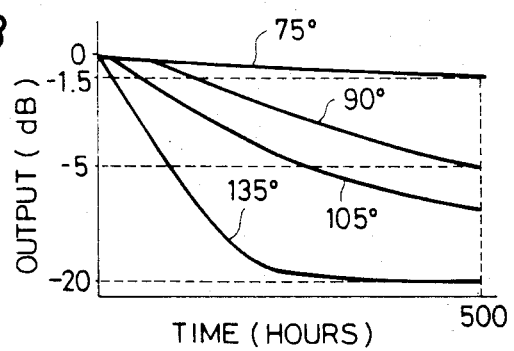
FIG. 3 is a graphic illustration of the results of tests conducted on the stylus of the invention for comparison with styli having a rearwardly inclined electrode with a different angle.

FIG. 3 shows the results of experiments conducted to ascertain the benefit of the forward inclination of the electrode in terms of stylus output level as a function of operational time of 500 hours which compares favorably with the electrode extending at right angles to the record surface or inclined rearward to the vertical. In one embodiment of the invention, the electrode 3 is inclined forward to the vertical so that its front face is at 75 degrees to the bottom face 4. In this case, the output signal level drops only 1.5 dB during the 500-hour test run. On the other hand, with the use of a vertically extending electrode the signal level has dropped 5 dB during the same period of time. Greater amounts of drop in signal level (as much as 20 dB) occurred in cases where the inclination angle $\theta$ is 105 degrees and 135 degrees. Since the output decay characteristic is representative of the amount of wear at the electrode's bottom rear edge, an electrode having a lesser inclination angle $\theta$ with respect to the bottom face 4 results in a reduced amount of wear, and in particular, for an acute inclination angle $\theta$ the amount of wear is found to diminish significantly.

While the smaller inclination angle $\theta$ would result in a diamond body 7 having a tendency to brittle on the rear face 2, this problem is eliminated by making the rear face 2 have a crystallographic plane other than the crystal plane (111).

The advantage of the forward inclination of electrode 3 is more fully understood with reference to explanatory views shown in FIGS. 4a, 4b, 5a, 5b, 6a and 6b.

Figure 4A:
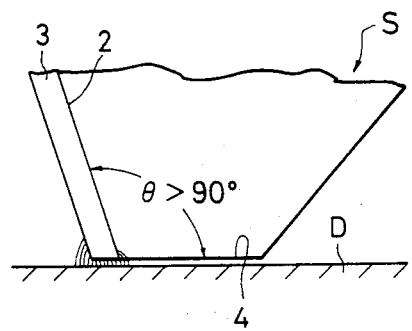
FIGS. 4a and 4b are explanatory views for describing the cause of wear on a rearwardly inclined electrode.
Figure 4B:
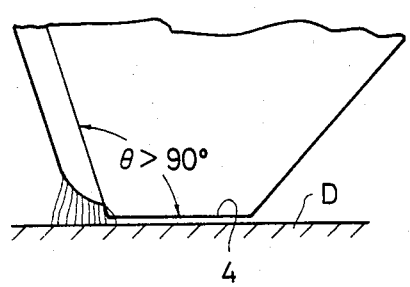

In FIG. 4a the electrode 3 has an obtuse angle of inclination with respect to the bottom face 4 of the stylus and is shown in the early period of use. The high frequency field is seen to result in a greater number of electric lines of force on the rear side of the stylus, due to its proximity to the record surface, than on the front side. As a function of operational time, the bottom edge wears out as shown in FIG. 4b creating a greater gap spacing toward the rear. This tends to accelerate the formation of a still greater number of electric lines of force to rapidly wear out the electrode.

Figure 5A:
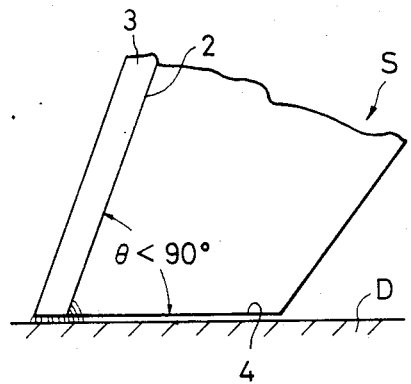
FIGS. 5a and 5b are explanatory views for describing the advantage of the stylus of the invention.
Figure 5B:
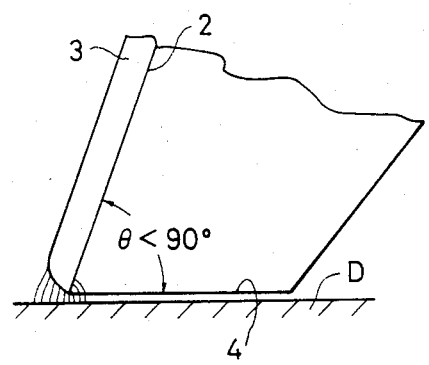

The electrode 3 of FIG. 5a is made according to the invention and shown to have a sharp bottom edge that exists in the early period of use. The high frequency field is seen to occur at the front side of electrode 3 due to its inclination toward the bottom 4 and is virtually nonexistent on the rear side. Thus the front-side concentration of electric lines of force results in a lesser concentration of field around its bottom rear edge, causing the electrode to wear less as a function of time as seen in FIG. 5b.

Figure 6A:
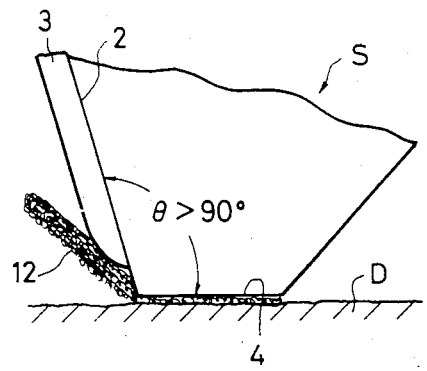
FIGS. 6a and 6b are explanatory views for describing another cause of wear.
Figure 6B:
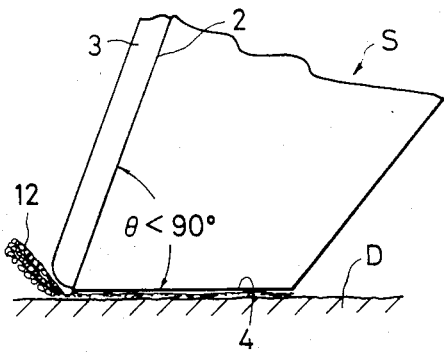

It is also found that as the disk spins at condsiderably high speeds surface irregularities which might exists on the disk are chipped off by the sharp edge of the stylus S, producing heated swarfs which tend to fuse together forming a spinning thread 12. The spinning threads scrape the bottom edge of the electrode away as it spins off at an elevated angle to the record surface as shown in FIGS. 6a and 6b. If the record disk is formed of a high polymer synthetic resin containing fine particles of carbon, the spinning thread acts as a conductive substance which reduces the effective gap spacing between the electrode and the disk. This causes a further increase in the electric lines of force and is considered particularly severe with the rearwardly inclined electrode (FIG. 6a) compared with the forwardly inclined electrode (FIG. 6b).

What is claimed is:

1. A record stylus for detecting, as capacitance variations, signals recorded on a surface of a recording medium in the form of minute pits along spiral or concentric tracks by generating a high-frequency electric field between the stylus and the recording medium, comprising a body of a hard, insulative material having a bottom face parallel to the surface of the recording medium and a rear face which is inclined forwardly from a perpendicular to the recording medium surface, and an electrode attached to said rear face and extending from said bottom face toward an upward end of the stylus, said electrode being applied, when in use, with a high-frequency potential with respect to said recording medium to generate said field.

2. A record stylus for detecting, as capacitance variations, signals recorded on a disk record in the form of minute pits along spiral or concentric tracks on the surface of said disk record by generating a high-frequency electric field between the stylus and the record disk, comprising a shank having a portion with a cross-sectional area decreasing toward one end of the stylus, a diamond partially embedded in said shank and having a decreasing cross-sectional area toward said one end of the stylus as a continuation of the decreasing cross-section of the shank and having a bottom face parallel to the surface of said disk record and a rear face, and an electrode attached to said rear face and extending from said bottom face of the diamond to an upward end of the stylus, the adjacent angle between said bottom face and rear face of the diamond being smaller than 90 degrees, said electrode being applied, when in use, with a high-frequency potential with respect to said record disk to generate said field.

3. A record stylus as claimed in claim 2, wherein the rear face of said diamond has a crystallographic plane other than (111).

4. A record stylus as claimed in claim 2 or 3, wherein said shank is formed of a conductive material.

5. A record stylus as claimed in claim 4, wherein said conductive material is hafnium or titanium.

6. A record stylus as claimed in claim 4, wherein said electrode is in ohmic contact with said shank.

7. A record stylus for detecting, as capacitance variations, signals recorded on a disk record in the form of minute pits along spiral or concentric tracks on the surface of said disk record by generating a high-frequency electric field between the stylus and the record disk, comprising a shank having a portion with a cross-sectional area decreasing toward one end of the stylus, a diamond partially embedded in said shank and having a decreasing cross-sectional area toward said one end of the stylus as a continuation of the decreasing cross-section of the shank and having a bottom face parallel to the surface of said disk record and a rear face, and an electrode attached to said rear face and extending from said bottom face of the diamond to an upward end of the stylus, the adjacent angle between said bottom face and rear face of the diamond being smaller than 90 degrees, said electrode being applied, when in use, with a high-frequency potential with respect to said record disk to generate said field, said shank formed of hafnium or titanium, said electrode being in ohmic contact with said shank and formed of the same material as said shank.

8. In a record stylus for detecting capacitance variations in the form a minute pits in a recording medium along tracks formed in the medium by application of a high-frequency electric field between the stylus and the recording medium, the stylus including a body formed of an insulative medium having forward and rear faces defined with respect to a direction of relative motion between said stylus and said recording medium, a bottom face, the bottom face being adjacent and parallel to the recording medium and between said forward and rear faces of said stylus body and an electrode attached to said rear face an extending from said bottom face toward an upward end of the stylus, the improvement comprising a structural arrangement for reducing wear of said electrode due to said high frequency electric field, wherein said electrode is inclined forwardly from a perpendiclar to said recording medium with respect to said direction of relative motion between said stylus and said recording medium to form an acute angle between said electrode and said bottom face of said stylus.

* * * * *